(12) United States Patent
Haka et al.

(10) Patent No.: US 7,437,963 B2
(45) Date of Patent: Oct. 21, 2008

(54) POWER TRANSMISSION

(75) Inventors: Raymond J. Haka, Brighton, MI (US); Hamid Vahabzadeh, Oakland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 222 days.

(21) Appl. No.: 11/285,613

(22) Filed: Nov. 21, 2005

(65) Prior Publication Data

US 2007/0113696 A1  May 24, 2007

(51) Int. Cl.
*F16H 3/08* (2006.01)
(52) U.S. Cl. .............................. 74/329; 74/331; 74/340
(58) Field of Classification Search ................. 475/329, 475/331, 340; 74/329, 331, 340
See application file for complete search history.

(56) References Cited

U.S. PATENT DOCUMENTS

| 5,517,874 | A | * | 5/1996 | Janiszewski | 74/325 |
| 5,592,854 | A | * | 1/1997 | Alfredsson | 74/331 |
| 6,050,152 | A | * | 4/2000 | Alfredsson | 74/325 |
| 6,202,499 | B1 | * | 3/2001 | Brinn | 74/329 |
| 6,766,705 | B1 | * | 7/2004 | Hall, III | 74/331 |
| 7,082,850 | B2 | * | 8/2006 | Hughes | 74/329 |
| 7,107,866 | B2 | * | 9/2006 | Baldwin et al. | 74/331 |
| 7,155,993 | B2 | * | 1/2007 | Koenig et al. | 74/331 |
| 7,243,565 | B2 | * | 7/2007 | Soeda | 74/329 |
| 2004/0069082 | A1 | * | 4/2004 | Koenig et al. | 74/335 |
| 2006/0101932 | A1 | * | 5/2006 | McCrary | 74/329 |
| 2006/0117882 | A1 | * | 6/2006 | Gitt | 74/340 |
| 2007/0137335 | A1 | * | 6/2007 | Lee | 74/329 |

* cited by examiner

Primary Examiner—Sherry Estremsky

(57) ABSTRACT

A synchronizer-controlled transmission has a plurality of input shafts, which are selectively connectible with a transmission input shaft, at least one countershaft, which rotatably supports a plurality of ratio gears, and an output shaft. A plurality of synchronizers is disposed along the countershaft and at least one input shaft to provide power transmission connections between the countershaft and the ratio gears disposed thereon. At least one ratio is established through direct connection between at least one input shaft and the output shaft.

7 Claims, 6 Drawing Sheets

POWER TRANSMISSION

TECHNICAL FIELD

This invention relates to power transmissions and, more particularly, to manual and dual clutch type transmissions.

BACKGROUND OF THE INVENTION

Power transmissions for automotive vehicles have undergone significant changes and progress over the years. Both manual selection of gear ratios and automatic selection of gear ratios have been undertaken. The use of both mechanical or synchronizer clutches and friction torque-transmitting devices have been employed.

Generally, the automatic transmissions have utilized hydraulically actuated friction devices and the manual transmissions have utilized mechanical synchronizer clutches. However, many current transmissions have automatic shifting capabilities and employ synchronizer type arrangements. These transmissions can therefore be made as manual or manually selected ratio transmissions or automatically selected ratio transmissions. Such devices might be of either a single input clutch or dual input clutch type of arrangement.

SUMMARY OF THE INVENTION

It is an object of the present invention to provide an improved power transmission including mechanical synchronizers for gear selection and employing either dual input clutches or a single input clutch for transmission operation.

In one aspect of the present invention, the transmission has coaxial input shafts and a single countershaft as well as an output shaft.

In another aspect of the present invention, the input shafts include at least one of the ratio gears and the countershaft includes a meshing ratio gear.

In yet another aspect of the present invention, the power transmission employs a plurality of dual synchronizer clutches to provide for ratio selection.

In still another aspect of the present invention, the transmission employs a plurality of single synchronizer mechanisms for ratio selection.

In yet still another aspect of the present invention, the transmission has dual countershafts supporting the ratio gears and the output shaft also supports meshing ratio gears.

In a further aspect of the present invention, one of the countershafts supports the even number ratio gears and the other of the countershafts supports the odd number ratio gears.

In yet a further aspect of the present invention, one of the ratio selections is a direct drive between the input shaft and the output shaft.

In a yet still further aspect of the present invention, a basic set of ratio gears and synchronizers can be assembled into a housing in a manner to provide either a single clutch input or a dual clutch input.

DESCRIPTION THE EXEMPLARY EMBODIMENTS

Figure 1:
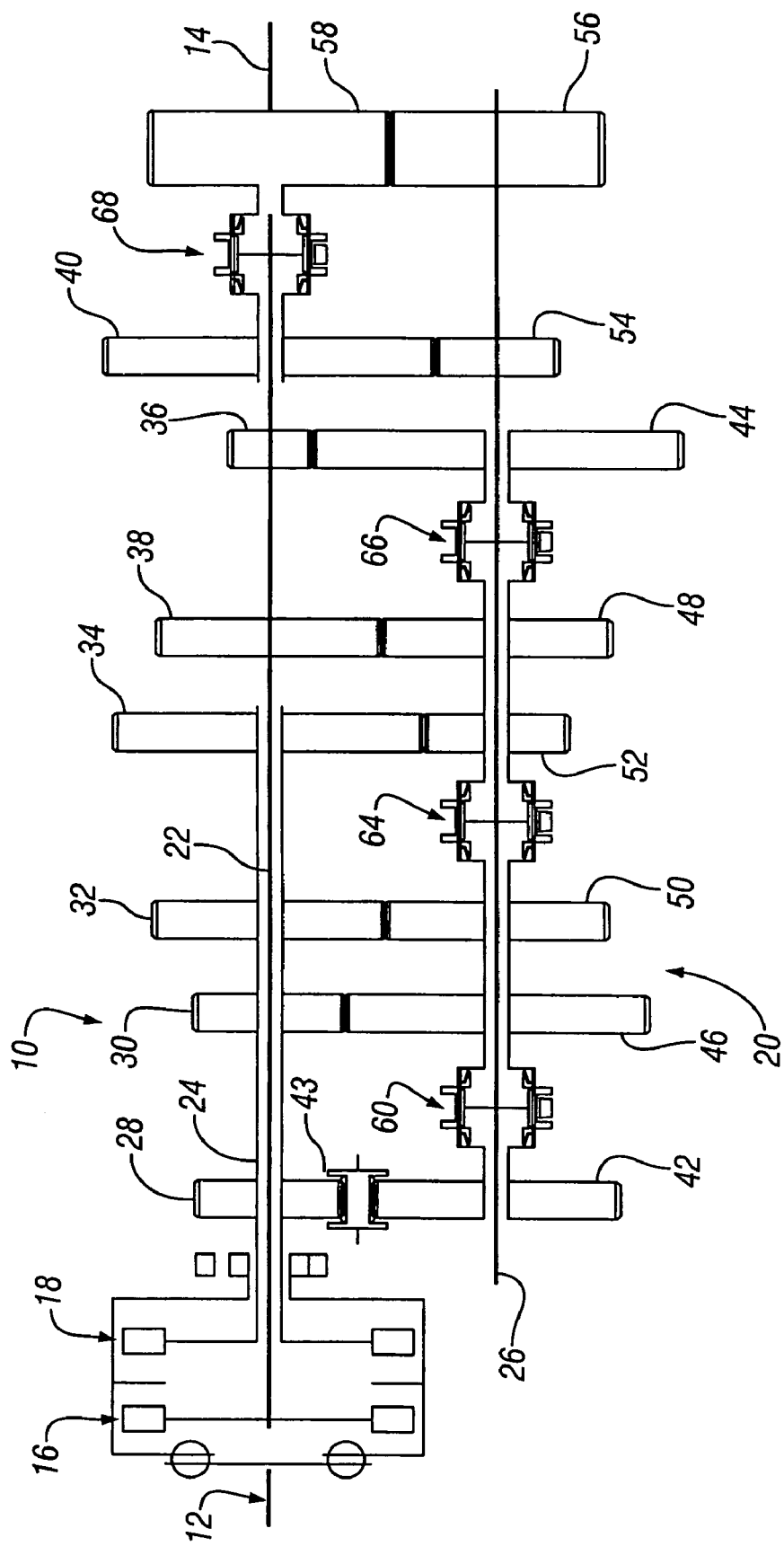
FIG. 1 is a diagrammatic representation of a power transmission incorporating one embodiment of the present invention.

Referring to the drawings, wherein like characters represent the same or corresponding parts throughout the several views, there is seen in FIG. 1 a power transmission 10 having an input shaft 12, an output shaft 14, a first input clutch 16, a second input clutch 18, and a plurality of ratio gears 20. The input clutch 16 is drivingly connected with an input shaft 22 and the input clutch 18 is drivingly connected with an input shaft 24.

A countershaft 26 is provided and arranged in parallel relationship with the input shafts 22 and 24. The input shaft 22 has drivingly connected therewith a reverse ratio gear 28, a second ratio gear 30, a fourth ratio gear 32, and a sixth ratio gear 34. The input shaft 22 has drivingly connected therewith a first ratio gear 36, a third ratio gear 38, and a seventh ratio gear 40.

The countershaft 26 has rotatably supported thereon a reverse ratio gear 42, a first ratio gear 44, a second ratio gear 46, a third ratio gear 48, a fourth ratio gear 50, a sixth ratio gear 52, and a seventh ratio gear 54. The seventh ratio gear 54 is drivingly connected with the countershaft 26 while the seventh ratio gear 40 is rotatably supported on the first input shaft 22. A pair of output gears 56 and 58 is secured to the countershaft 26 and output shaft 14, respectively.

A first synchronizer assembly 60 is disposed between the reverse ratio gear 42 and the second ratio gear 46. A second synchronizer assembly 64 is disposed between the fourth ratio gear 50 and the sixth ratio gear 52. A third synchronizer assembly 66 is disposed between the third ratio gear 48 and the first ratio gear 44. A fourth synchronizer assembly 68 is disposed between the seventh ratio gear 40 and the output shaft 14. While the embodiments described herein have seven forward speeds ratios and one reverse ratio, the invention is not limited to transmissions of this range. For example, the transmission may have any number of forward speed. However, it known that by providing and even number of overall ratios (forward and reverse) requires only a minimal increase of hardware. If an overall odd number of ratios is employed a single synchronizer is used for at least one ratio. An increase of one ratio only requires that the single synchronizer be converted to a double synchronizer which requires minimum change.

All of the synchronizers 60, 64, 66, and 68 are double acting synchronizers; that is, movement in one direction will provide a drive connection between the respective shaft and the ratio gear and movement in the other direction will provide connection between another ratio gear and the respective shaft. For example, the synchronizer assembly 60 when moved leftward, as viewed in FIG. 1, will connect the reverse ratio gear 42 with the countershaft 26 and when moved rightward will connect the second ratio gear 46 with the countershaft 26.

Likewise, the synchronizer assembly 64 will complete the drive connection of the fourth and sixth ratio gears 50 and 52, respectively. The synchronizer assembly 66 will complete the drive connection between the third ratio gear 48 and the first ratio gear 44, respectively, with the countershaft 26. The synchronizer assembly 68 is operable to complete the connection between the seventh ratio gear 40 and the shaft 22 and between the input shaft 22 and the output shaft 14. The fifth ratio is a direct drive ratio when power is transmitted directly from the input shaft 12 through the input clutch 16 to the output shaft 14.

With the transmission arrangement shown, there are seven forward ratios and one reverse ratio. The reverse, ratio for convenience, is considered an even number ratio and therefore there are four even number ratios, reverse, second, fourth, and sixth, and four odd number ratios first, third, fifth and seventh. The disposition of the ratio gears around the input shafts 22 and 24 and the countershaft 26 does not lend itself well to a conventional "H" type shifting pattern and therefore would generally be used with an automatic shifting operation. This arrangement also lends itself well to a dual clutch transmission, such as that shown, wherein one clutch is input for the odd number ratios and the other clutch is engaged for the even number ratios.

For example, to establish the first forward speed ratio, the clutch 16 is engaged and the synchronizer 66 is manipulated through a conventional rail and fork system to connect the first ratio gear 44 with the countershaft 26. During the first forward speed ratio, the engine power flows through the clutch 16, the input shaft 22, the ratio gears 36 and 44, and the output gears 56 and 58 through the output shaft 14. In employing a dual input clutch arrangement while the first ratio is established, the second ratio may be preselected by engaging the synchronizer to connect the second ratio gear 46 with the countershaft 26.

A ratio change from first to second is established by disengaging the clutch 16 and engaging the clutch 18. The power flow in second gear will be from the input shaft 12 through the clutch 18, shaft 24, ratio gears 30 and 46, countershaft 26, the output gears 56 and 58 to the output shaft 14.

The transmission arrangement shown in FIG. 1, as previously mentioned, uses double acting synchronizers and therefore employs four rails, not shown, to control the forks for these synchronizers. One rail controls the first and third synchronizer 66, a second rail controls the sixth and fourth synchronizer 64, a third rail controls the fifth and seventh synchronizer 68, and a fourth rail controls the second and reverse synchronizer 60. This arrangement does not lend itself to a conventional "H" pattern for shift control and therefore is more suited for an automatic type shifting arrangement. The rails may be controlled in a conventional manner well known to those skilled in the art wherein the input control selects the rail to be manipulated and establishes the desired ratio accordingly.

Figure 2:
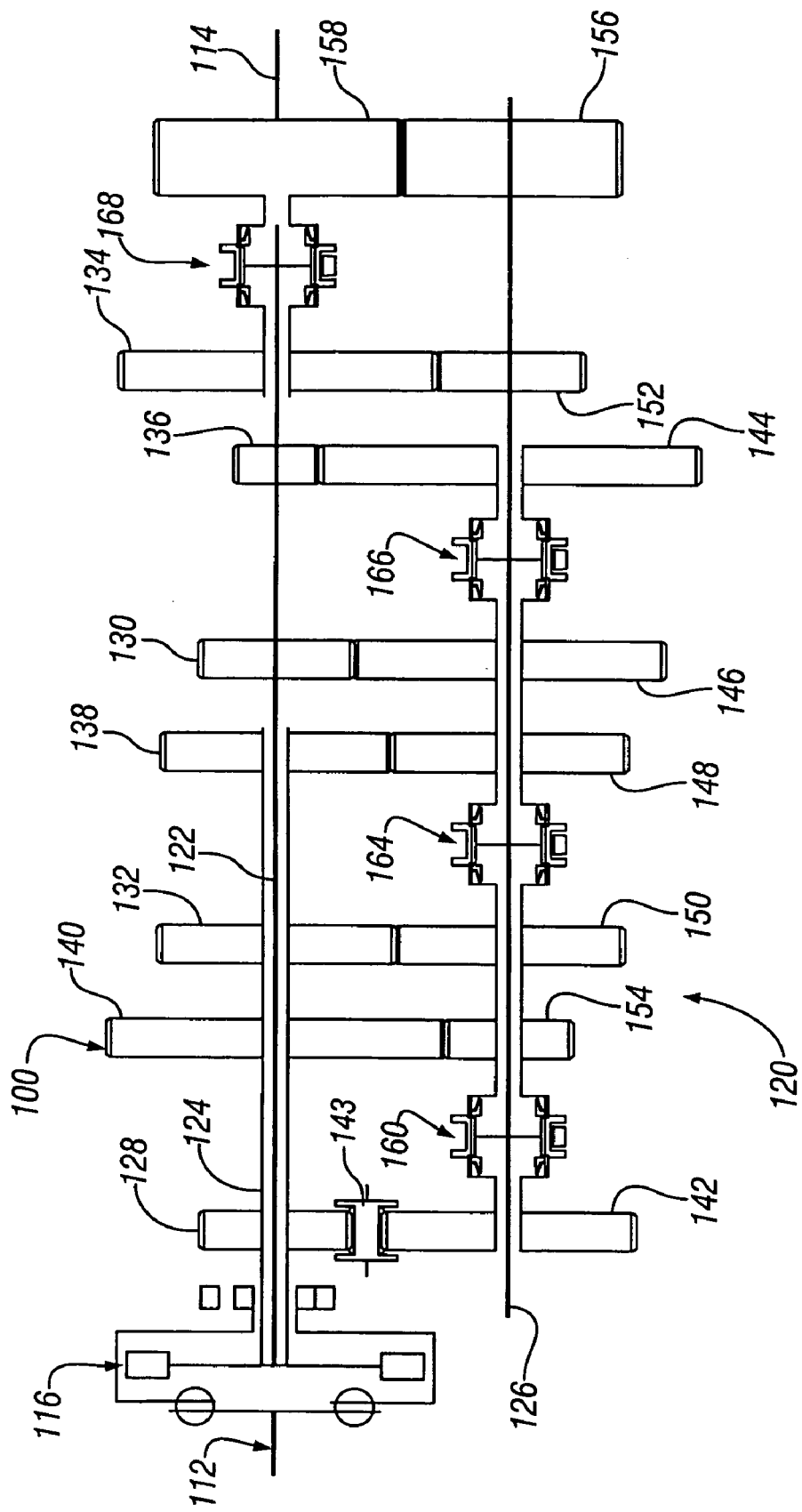
FIG. 2 is a diagrammatic representation of a power transmission incorporating another embodiment of the present invention.

In FIG. 2, there is seen a power transmission generally designated 100 having an input shaft 112, an output shaft 114, an input clutch 116, and a plurality of ratio gears 120. The clutch 116 is drivingly connected with a pair of input shafts 122 and 124. A single input shaft may replace the two input shafts 122 and 124 if desired when a single input clutch transmission is being constructed.

A reverse ratio gear 128 is secured with the input shaft 124, a seventh ratio gear 140 is secured to the shaft 124, a fourth ratio gear 132 is secured to the shaft 124, and a third ratio gear 138 is secured to the shaft 124. A pair of ratio gears representing first and second 136 and 130 are secured to the input shaft 122 as is a synchronizer 168. The synchronizer 168 will selectively connect a sixth ratio gear 134 with the shaft 122 or selectively connect the input shaft 122 with the output shaft 114 to provide a direct drive.

A countershaft 126 rotationally supports a reverse ratio gear 142, which meshes through an idler gear 143 with the ratio gear 128. A seventh ratio gear 154, fourth ratio gear 150, third ratio gear 148, second ratio gear 146, and first ratio gear 144 are all rotatably supported on the countershaft 126. A sixth ratio gear 152 is secured and rotates with the countershaft 126 as does an output gear 156, which in turn meshes with a ratio gear 158, which in turn is drivingly connected with the output shaft 114.

Four synchronizer mechanisms 160, 164, 166, and 168 are disposed within the transmission 100. The synchronizer mechanism 160 is operable to connect the reverse ratio gear 142 or the seventh ratio gear 154 with the countershaft 126. The synchronizer mechanism 164 alternatively selects the connection of the countershaft 126 with the fourth ratio gear 150 or the third ratio gear 148. The synchronizer mechanism 166 alternatively selects the first ratio gear 144 or the second ratio gear 146 with the countershaft 126. As previously mentioned, the synchronizer mechanism 168 alternatively selects the sixth ratio gear 134 by the output shaft 114 for connection with the input shaft 122.

The gearing arrangement shown in FIG. 2 lends itself well to a manual type transmission wherein only a single input clutch is desired since the operator will manipulate the clutch either manually or through an automatic control while the synchronizer selections are made either manually or automatically. In the "H" pattern control, it will be noted that the synchronizer 166 will select the first ratio when moved to the right and the second ratio when moved to the left while the synchronizer 164 will select the third ratio when moved to the right and fourth ratio when moved to the left, and the synchronizer 168 will select the fifth ratio when moved to the right and the sixth ratio when moved to the left, and the synchronizer 160 will select the seventh ratio when moved to the right and reverse ratio when moved to the left.

As previously mentioned, in an odd number of ratios, the reverse is considered an even ratio number in the selection process. Therefore, the shift mechanism, which comprises four rails and four yokes for controlling the synchronizers will move through an "H" pattern, moving along a neutral position it will move upward or to the right for first gear, left for second, right for third, left for fourth, right for fifth, left for sixth, right for seventh, and left for reverse. The ratio gears and their tooth numbers in FIG. 2 are identical with the ratio gears and tooth numbers in FIG. 1, the difference is the location of the gears such that in FIG. 2 the transmission lends itself well to a single input clutch manual transmission whereas in FIG. 1 the arrangement lends itself well to a dual clutch transmission with automatic shifting controls.

By providing the same ratio gears in both a single clutch input and a dual clutch input there are many manufacturing benefits. For example the same ratio gears, synchronizers, and shift rails can be used. Also, the same basic transmission housing is used. The most significant change is the input clutches and the control mechanism. A single input clutch lends itself to a manual shift control for the shift rails while a dual input clutch generally requires an automatic control for the shift rails. The automatic control will generally involve a electronic control unit (ECU) which includes a programmable digital computer to initiate the shift sequence. These types of automatic control systems are well known and used quite extensively in planetary type transmissions.

Figure 3:
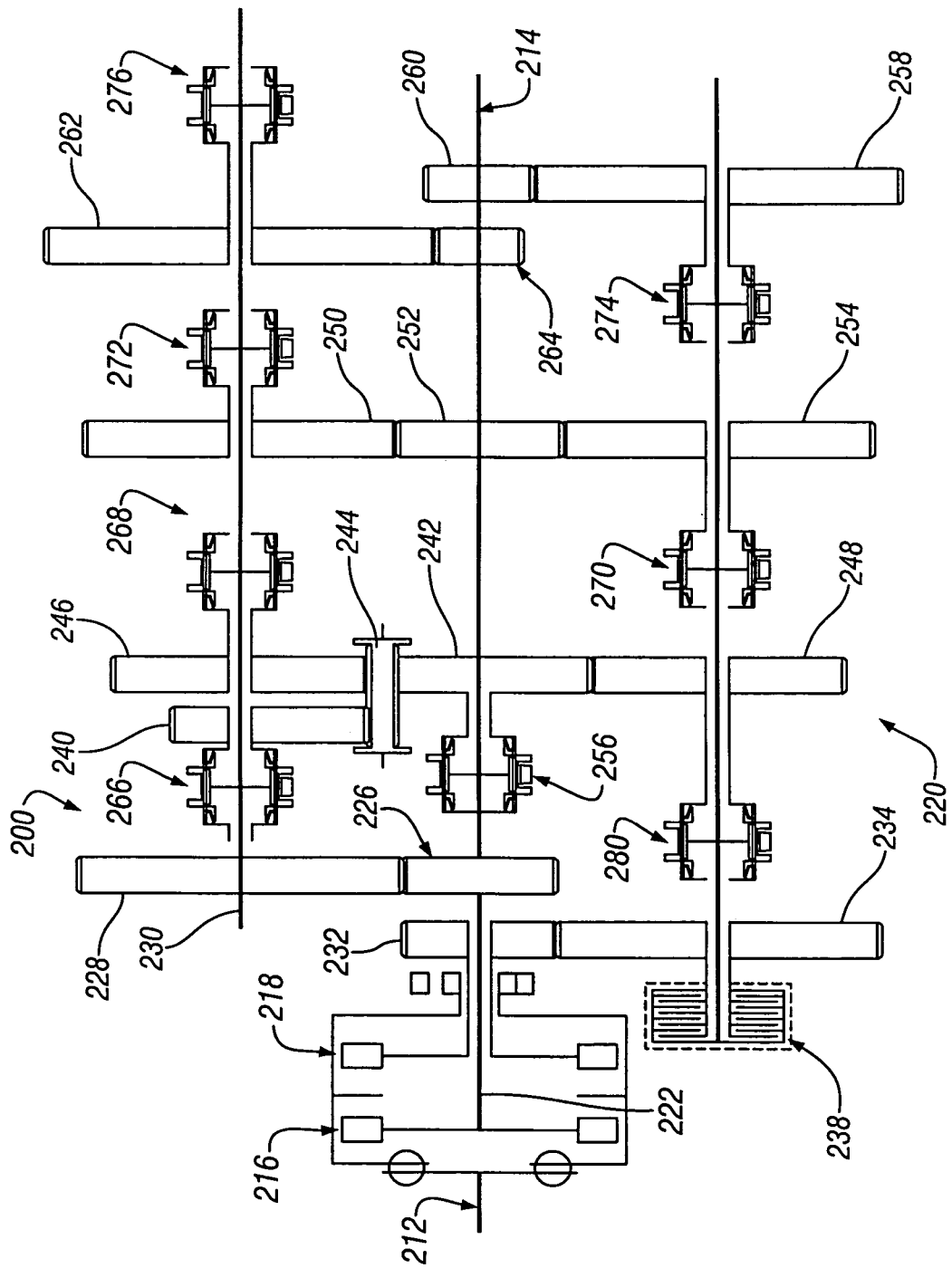
FIG. 3 is a diagrammatic representation of another embodiment of the present invention.

A transmission 200, shown in FIG. 3, includes a power input shaft 212, an output shaft 214, a first input clutch 216, a second input clutch 218, and a plurality of ratio gears 220. The input clutch 216 is drivingly connected with an input shaft 222 and the input clutch 218 is drivingly connected with an input shaft 224. The input shaft 222 has drivingly connected therewith a first head gear 226, which in turn meshes with a second head gear 228, which in turn is drivingly connected with a countershaft 230. The input shaft 224 has drivingly connected therewith a head gear set 232, which is meshingly engaged with a head gear set 234, which in turn is drivingly connected with a countershaft 236.

Shown in dashed lines is a clutch 238 that is an alternative for the clutch 218. If a dual clutch transmission is employed, the clutch 216 would be eliminated and the clutch 238 would be directly connected with the countershaft 236. The ratio gears 220 include a reverse ratio gear 240, a gear 242, and an idler gear 244. The gear 240 is rotatably mounted on the countershaft 230 and the gear 242 is drivingly connected with the output shaft 214.

A first gear ratio gearset includes a ratio gear 246 in mesh with the ratio gear 242. The ratio gear 246 is rotatably supported on the countershaft 230. A second ratio gearset includes ratio gears 248 and the ratio gear 242. The ratio gear 248 is rotatably supported on the countershaft 236. A third ratio gearset includes a ratio gear 250 rotatably supported on the countershaft 230 and a ratio gear 252 drivingly connected with the output shaft 214. A fourth ratio gearset includes a ratio gear 254 rotatably supported on the countershaft 236 and the ratio gear 252. A fifth ratio gearset is accomplished by connecting the input shaft 222 directly with the output shaft 214 through a synchronizer mechanism or assembly 256. A sixth ratio gearset includes a ratio gear 258 rotatably supported on the countershaft 236 and a ratio gear 260 drivingly connected with the output shaft 214. A seventh ratio gearset includes a ratio gear 262 rotatably supported on the countershaft 230 and a ratio gear 264 drivingly connected with the output shaft 214.

A synchronizer assembly 266 connects the reverse ratio gear 240 with the countershaft 230. A synchronizer assembly 268 connects the ratio gear 246 with the countershaft 230. A synchronizer assembly 270 connects the ratio gear 248 with the countershaft 236. A synchronizer assembly 272 connects the ratio gear 250 with the countershaft 230. A synchronizer assembly 274 selectively connects the ratio gear 258 with the countershaft 236. A synchronizer assembly 276 selectively connects the ratio gear 262 with the countershaft 230. A synchronizer assembly 270 connects the ratio gear 254 with the countershaft 236.

The use of two head gear sets permit a variety of ratio selections and gear sizes to be employed within the transmission. It also permits the use of a single ratio gear secured with the output shaft 214 for the reverse, first, and second gear ratios and the single ratio gear 252 connected with the output shaft 214 for the third and fourth ratio gears. The sixth and seventh ratios described have separate gears drivingly connected with the output shaft 214 which will permit a wide variety of gear selections for these ratios.

It will be noted that the power transmission 200 employs eight single stage synchronizers. Each of these synchronizers would be controlled by a shift rail, therefore eight shift rails and eight synchronizers would be employed. The shift mechanism would be designed to pick up the desired shift rails in establishing the ratio to be employed. Also the use of single acting synchronizers permits the shift pattern to be widely varied and does lend itself to the use of an "H" shift pattern when using a manual shifting transmission wherein the operator controls disengagement of the input clutch and selection of the synchronizer.

The transmission shown in FIG. 3 provides seven forward ratios and one reverse ratio and the fifth forward ratio is a direct drive similar to the transmissions described in FIGS. 1 and 2. The operator establishes the reverse ratio by engaging the reverse synchronizer 266 such that the power flow pattern is from the input shaft 212 through the clutch 216, the head gears 226 and 228, the reverse gears 240, 244, and 242 to the output shaft 214.

The first forward ratio is established by the synchronizer 268, which connects the gear 246 to the countershaft 230 such that the power flow is from the input shaft 212 to the clutch 216, the head gears 226 and 228, the first ratio gears 246 and 242 to the output shaft 214. If a dual clutch transmission is being employed, the second ratio synchronizer 270 can be engaged during the first ratio and the ratio interchange can be made by swapping the clutches 216 and 218, or by swapping the clutches 216 and 238 if the alternative clutch 238 is employed. The power flow during the second forward ratio is through the head gear sets 232 and 234, the ratio gears 248 and 242, through the output shaft 214.

If a single manual clutch system is employed, the input clutch 216 would have the input shaft 222 splined to the input shaft 224, such that the head gears 226 and 232 would be rotated in unison with the input shaft 212 whenever the clutch 216 is engaged. As previously mentioned, the use of single synchronizers controlled by single rails will permit the establishment of an "H" type shifting pattern which the operator would be familiar with. If desired, the shift mechanism controlling the transmission shown in FIG. 3 can employ three shift rails and the control mechanism will change or establish which of the synchronizer forks is controlled with the shift rail. Although, this provides a more complicated control design, it does reduce the number of shift rails required.

Figure 4:
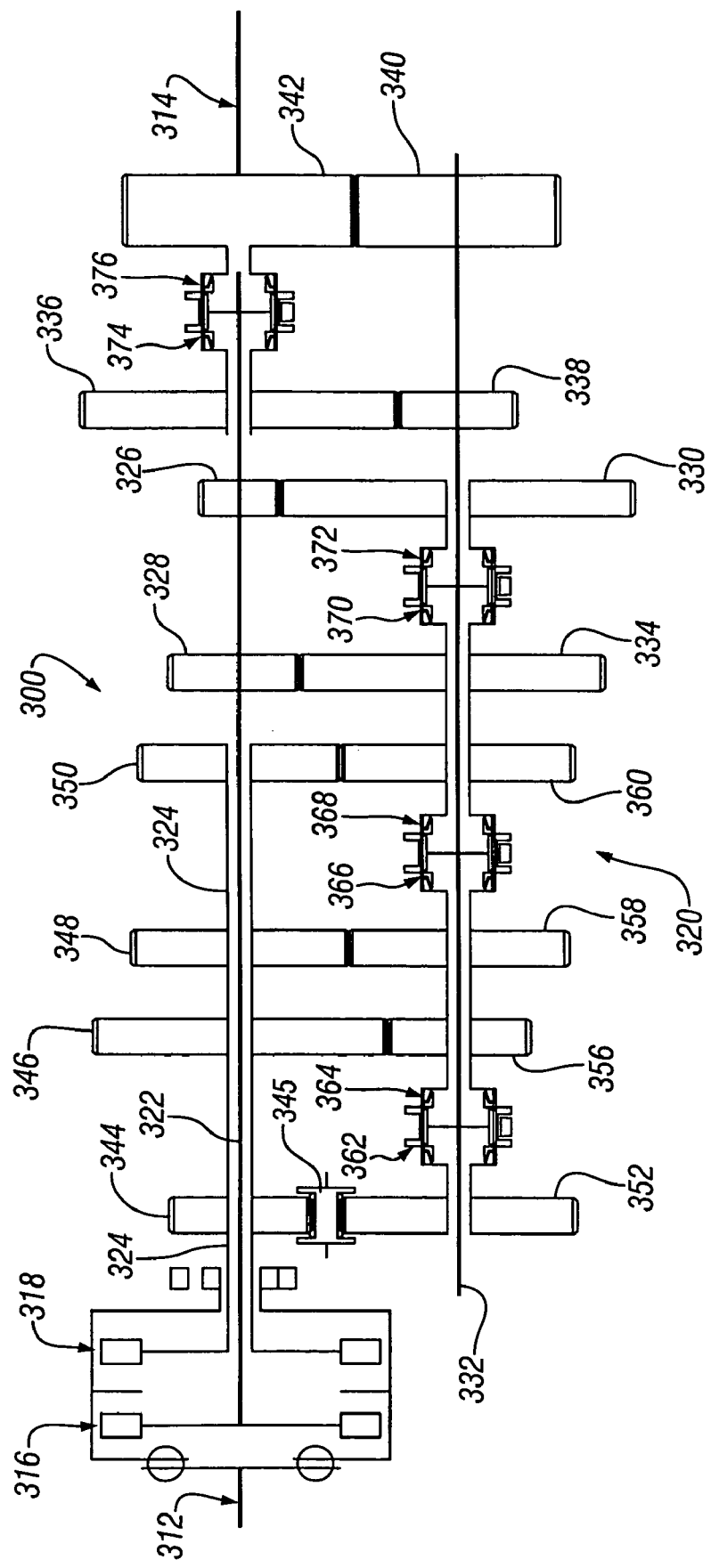
FIG. 4 is a diagrammatic representation of a further embodiment of the present invention.

A transmission 300, shown in FIG. 4, has a power input shaft 312, an output shaft 314, a first input clutch 316, a second input clutch 318, and a plurality of ratio gears 320. The input clutch 316 is drivingly connected with an input shaft 322 and the input clutch 318 is drivingly connected with an input shaft 324. The input shaft 322 has drivingly connected therewith a first ratio gear 326 and a second ratio gear 328. The first ratio gear 326 meshes with another first ratio gear 330, which is rotatably supported on a countershaft 332. The second ratio gear 328 is meshingly connected with a second ratio gear 334, which is rotatably mounted on the countershaft 332.

A sixth ratio gear 336 is rotatably supported on the input shaft 322 and meshes with another sixth ratio gear 338, which is drivingly connected with the countershaft 332. The countershaft 332 is drivingly connected with an output gear 340, which meshes with an output gear 342, which in turn is drivingly connected with the output shaft 214.

A reverse ratio gear 344, a seventh ratio gear 346, a fourth ratio gear 348, and a third ratio gear 350 are all drivingly connected with the input shaft 324. The reverse ratio gear 344 drivingly meshes with a reverse ratio gear 352 through an idler gear 345. The reverse ratio gear 352 is rotatably supported on the countershaft 332. The seventh ratio gear 346 meshes with a seventh ratio gear 356, which is rotatably supported on the countershaft 332. The fourth ratio gear 348 meshes with a fourth ratio gear 358, which is rotatably supported on the countershaft 332. The third ratio gear 350 meshes with a third ratio 360, which is rotatably supported on the countershaft 332.

The reverse ratio gear 352 is connectible with the countershaft 332 through a synchronizer assembly 362 and the seventh ratio gear 356 is connectible with the countershaft 332 through a synchronizer assembly 364. The fourth ratio gear 358 is connectible with the countershaft 332 through a selectively operable synchronizer assembly 366. The third ratio gear 360 is selectively connectible with the countershaft 332 through a selectively operable synchronizer assembly 368. The second ratio gear 334 is selectively connectible with the countershaft 332 through a selectively operable synchronizer assembly 370. The first ratio gear 330 is selectively connectible with the countershaft 332 through a selectively operable synchronizer 372. The sixth ratio gear 336 is selectively connectible with the output shaft 314 through a selectively engageable synchronizer 374. The input shaft 322 is directly connectible with the output shaft 314 through a selectively engageable synchronizer 376.

The transmission arrangement 300 lends itself to either single or double acting synchronizers and will also lend itself to dual clutch transmissions for more conventional single clutch manual transmissions. If a single clutch manual transmission is employed, the forks controlling the first and second synchronizers would be on the same shift rail, the third and fourth synchronizers would be on the same shift rail, the fifth and sixth synchronizers would be on the same shift rail, and the seventh and reverse synchronizers would be on the same shift rail.

Figure 5:
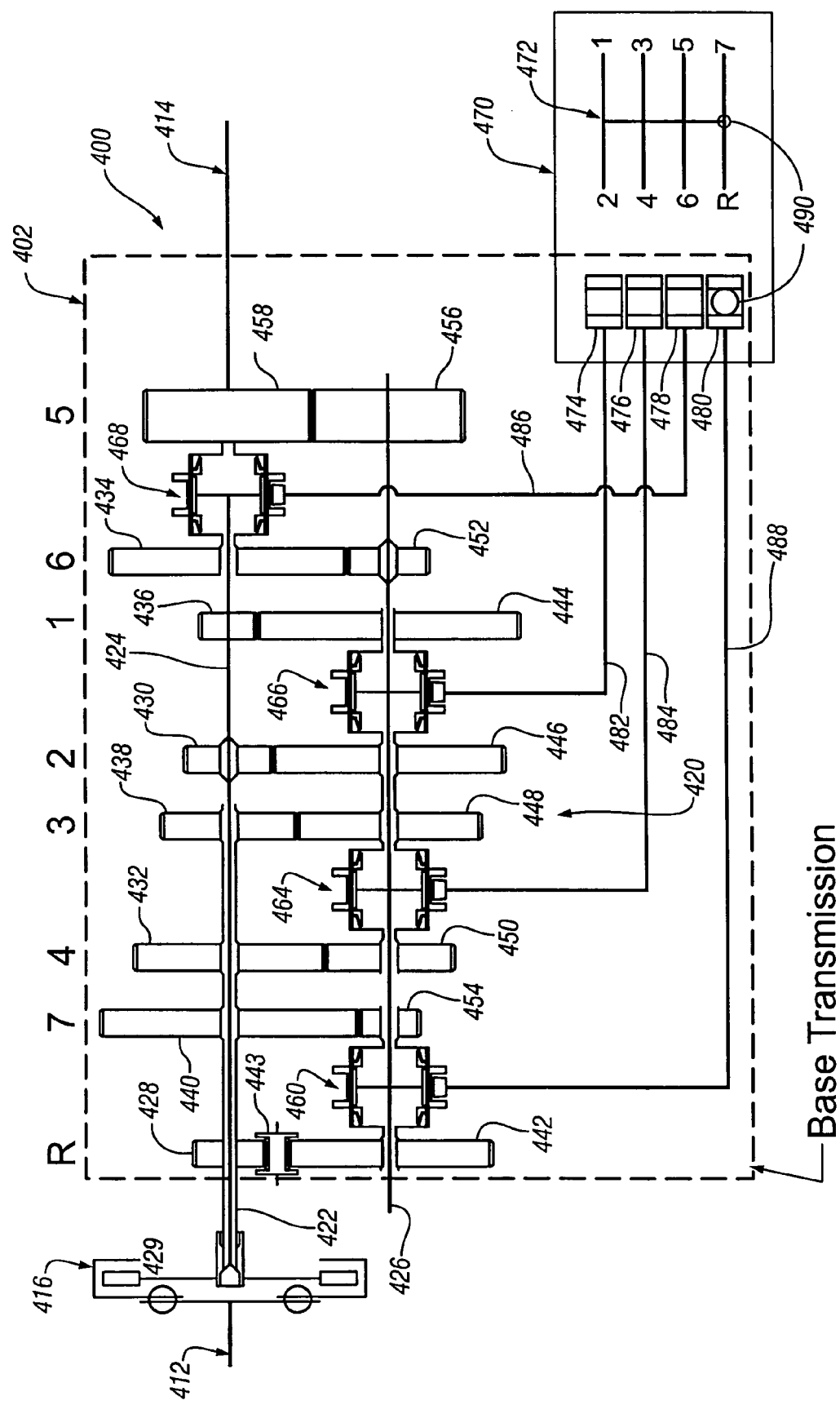
FIG. 5 is a diagrammatic representation of a further embodiment of the present invention describing a single clutch input.

In FIG. 5, there is seen a power transmission generally designated 400 having an input shaft 412, an output shaft 414, an input clutch 416, and a plurality of ratio gears 420. The clutch 416 is drivingly connected with a pair of input shafts 422 and 424. A single input shaft may replace the two input shafts 422 and 424 if desired when a single input clutch transmission is being constructed.

A reverse ratio gear 428 is secured with the input shaft 422, a seventh ratio gear 440 is secured to the shaft 422, a fourth ratio gear 432 is secured to the shaft 422, and a third ratio gear 438 is secured to the shaft 422. A pair of ratio gears representing first and second 436 and 430 are secured to the input shaft 424 as is a synchronizer 468. The synchronizer 468 will selectively connect a sixth ratio gear 434 with the shaft 424 or selectively connect the input shaft 424 with the output shaft 414 to provide a direct drive.

A countershaft 426 rotationally supports a reverse ratio gear 442, which meshes through an idler gear 443 with the ratio gear 428. A seventh ratio gear 454, fourth ratio gear 450, third ratio gear 448, second ratio gear 446, and first ratio gear 444 are all rotatably supported on the countershaft 426. A sixth ratio gear 452 is secured and rotates with the countershaft 426 as does an output gear 456, which in turn meshes with a ratio gear 458, which in turn is drivingly connected with the output shaft 414.

Four synchronizer mechanisms 460, 464, 466, and 468 are disposed within the transmission 400. The synchronizer mechanism 460 is operable to connect the reverse ratio gear 442 or the seventh ratio gear 454 with the countershaft 426. The synchronizer mechanism 464 alternatively selects the connection of the countershaft 426 with the fourth ratio gear 450 or the third ratio gear 448. The synchronizer mechanism 466 alternatively selects the first ratio gear 444 or the second ratio gear 446 with the countershaft 426. As previously mentioned, the synchronizer mechanism 468 alternatively selects the transmission input shaft 422 for connection with the sixth ratio gear 434 or the output shaft 414.

The gearing arrangement shown in FIG. 5 lends itself well to a manual type transmission wherein only a single input clutch is desired since the operator will manipulate the clutch either manually or through an automatic control while the synchronizer selections are made either manually or automatically. In the "H" pattern control, it will be noted that the synchronizer 466 will select the first ratio when moved to the right and the second ratio when moved to the left while the synchronizer 464 will select the third ratio when moved to the right and fourth ratio when moved to the left, and the synchronizer 468 will select the fifth ratio when moved to the right and the sixth ratio when moved to the left, and the synchronizer 460 will select the seventh ratio when moved to the right and reverse ratio when moved to the left.

A control mechanism is shown schematically at 470. The control mechanism includes an "H" pattern shift control 472, four shift rails 474, 476, 478, and 480, and four shift forks 482, 484, 486, and 488. The shift control 472 can be mounted directly over the shift rails 474, 476, 478, and 480 and a peg or arm 490 extend between them. The peg 490 is moved (axially in the vehicle cabin) by the shift control 472 to select the shift rail to be manipulated and then moved in the vehicle cabin to select the desired ratio. The shift fork 482 is connected between the rail 474 and the synchronizer 466. The shift fork 484 is connected between the rail 476 and the synchronizer 464. The shift fork 486 is connected between the rail 478 and the synchronizer 468. The shift fork 488 is connected between the rail 480 and the synchronizer 460.

The shift control 472 is manipulated by the operator in a well-known manner to select the desired ratio. The "H" pattern of the shift control is shown in a conventional arrangement with first and second ratios on the shift rail 474, third and fourth ratios on the shift rail 476, fifth and sixth ratios on the shift rail 478, and seventh and reverse ratios on the shift rail 480.

Figure 6:
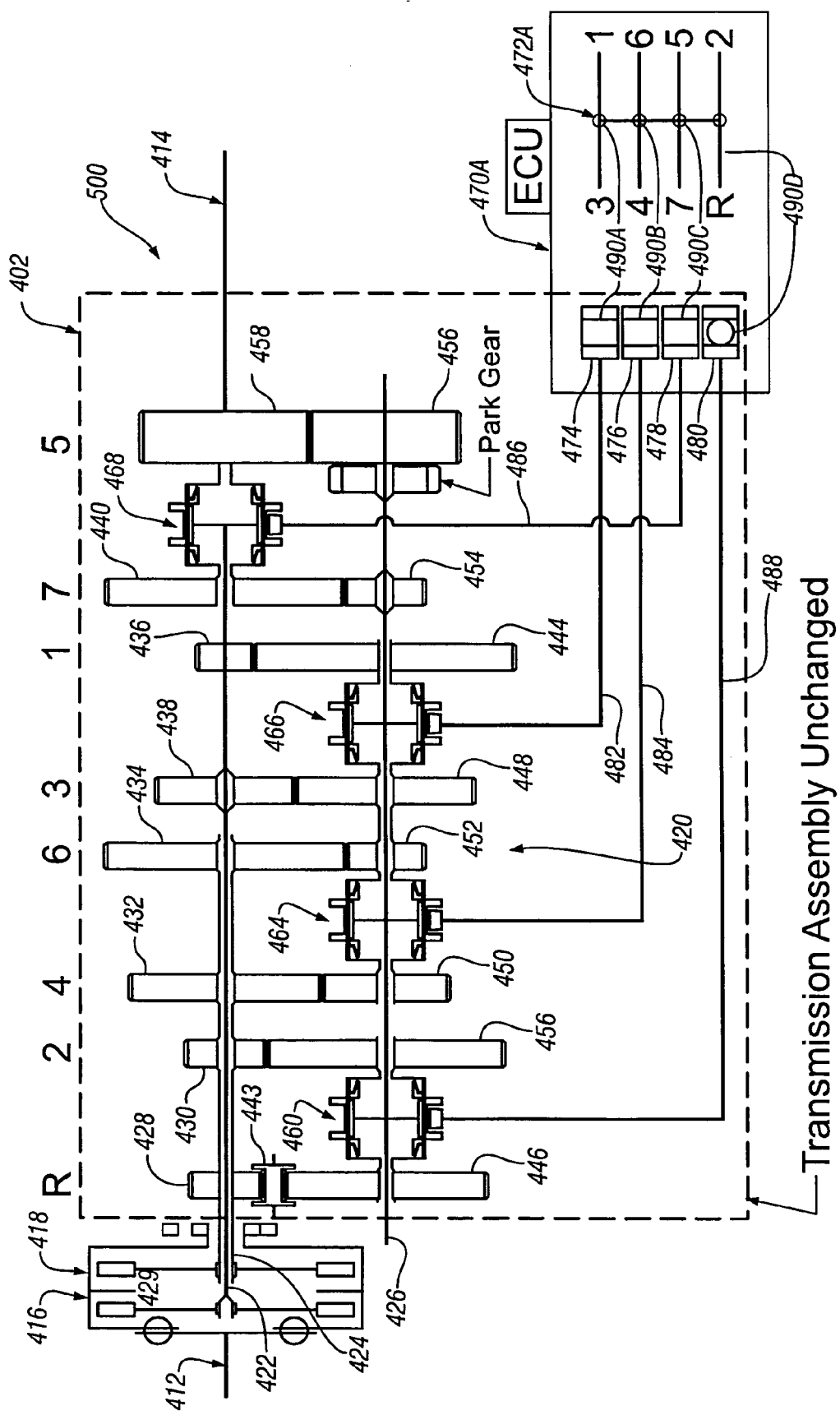
FIG. 6 is a diagrammatic representation of a still further embodiment of the present invention similar to the embodiment of FIG. 5 and describing a dual clutch input.

A dual clutch transmission arrangement generally designated 500 is shown in FIG. 6. The major components of the transmission arrangement 500 are the same as the transmission arrangement 400 such that the same components have been given the same numerical designation and similar components have been given the same numerical designation with an alpha suffix. Accordingly the power transmission 500 has an input shaft 412, an output shaft 414, two input clutches 416 and 418, and a plurality of ratio gears 420. The clutch 416 is drivingly connected between the power input shaft 412 and the input shaft 422. The input clutch 418 is drivingly connected between the power input shaft 412 and the transmission input shaft 424

The reverse ratio gear 428 is secured with the transmission input shaft 424, a second ratio gear 430 is secured to the shaft 424, a fourth ratio gear 432 is secured to the shaft 424 and the sixth ratio gear 434 is secured to the shaft 424. The third ratio gear 438 is secured to the input shaft 422, the first ratio gear 436 is secured to the input shaft 422 and the synchronizer assembly 468 is secured to the input shaft 422. The synchronizer assembly 468 will selectively connect the seventh ratio gear 440 with the input shaft 422 or selectively connect the input shaft 422 with output shaft 414 to provide a direct drive (fifth gear).

A countershaft 426 rotationally supports a reverse ratio gear 442, which meshes through an idler gear 443 with the reverse ratio gear 428. A second ratio gear 446, a fourth ratio gear 450, a sixth ratio gear 452, third ratio gear 448, and first ratio gear 444 are all rotatably supported on the countershaft 426. The seventh ratio gear 454 and the output gear 456 are both secured with the countershaft 426. The output gear 456 is in mesh with the output gear 458 which is drivingly connected with the output shaft 414.

Four synchronizer mechanisms 460, 464, 466, and 468 are disposed within the transmission 400. The synchronizer mechanism 460 is operable to connect the reverse ratio gear 442 or the second ratio gear 446 with the countershaft 426. The synchronizer mechanism 464 alternatively selects the connection of the countershaft 426 with the fourth ratio gear 450 or the sixth ratio gear 452. The synchronizer mechanism 466 alternatively selects the first ratio gear 444 or the third ratio gear 448 with the countershaft 426. As previously mentioned, the synchronizer mechanism 468 alternatively selects the seventh ratio gear 440 with the input shaft 422 or selects the transmission input shaft 422 to connect directly with the output shaft 414.

The gearing arrangement shown in FIG. 6 lends itself well to an automatic dual clutch type transmission 470A wherein the control will manipulate the clutches through an automatic control and the synchronizer selections are made automatically. A conventional ECU is programmed to provide the shift sequence. In the "H" pattern control 472A, it will be noted that the synchronizer 466 will select the first ratio when moved to the right and the third ratio when moved to the left, the synchronizer 460 will select the second ratio when moved to the right and the reverse ratio when moved to the left, the synchronizer 468 will select the fifth ratio when moved to the right and the seventh ratio when moved to the left, and the synchronizer 466 will select the sixth ratio when moved to the right and the fourth ratio when moved to the left.

The control mechanism is shown schematically at 470A. The control mechanism includes an "H" pattern shift control 472A, four shift rails 474, 476, 478, and 480, and four shift forks 482, 484, 486, and 488. The shift control 472A can be mounted directly over the shift rails 474, 476, 478, and 480 and a plurality of pegs or arms 490A, B, C, D respectively extend between them. The pegs 490A, B, C, D are moved individually to select the desired ratio. The pegs 490A, B, C, D may also be manipulated to select the next ratio in anticipation of an interchange. For example, if the transmission is in first gear, the synchronizer 460 can be manipulated to select the connection of the second ratio gear 446. The interchange to second will not be completed until the clutches 416 and 418 are swapped. The shift fork 482 is connected between the rail 474 and the synchronizer 466. The shift fork 484 is connected between the rail 476 and the synchronizer 464. The shift fork 486 is connected between the rail 478 and the synchronizer 468. The shift fork 488 is connected between the rail 480 and the synchronizer 460.

The shift control 472A is operated by the ECU in a well-known manner to select the desired ratio. The synchronizers are shown in the same locations in both FIG. 5 and FIG. 6 while some of the ratio gears are relocated along the shafts to accommodate the pre-selection of ratios permitted by the automatic control and the dual input clutches.

When a dual clutch transmission is to be employed, the first and third rail would operate the same shift fork, the fourth and sixth rail would operate the same shift fork, the fifth and seventh rail would operate the same shift fork, and the fourth and sixth rail would operate the same shift rail. This, of course, is why the ratio gears are redistributed within the transmission housing 402. However, it should now be apparent to those skilled in the art, this invention permits both manual, single clutch and automatic, dual clutch transmissions to be assembled on a common production line. Also this invention will permit the use of common components which reduces the cost of manufacture. The only significant differences between the transmissions is the input clutches and the location of gear ratio pairs.

The invention claimed is:

1. A power transmission comprising:
a power input shaft;
a power output shaft;
a first and second transmission input shaft;
means for connecting said first and second transmission input shaft with said power input shaft;
a plurality of ratio gear members disposed in meshing relation to provide a plurality of ratio gear pairs selectively operable to provide an even gear ratio group having at least second, fourth and sixth, and reverse ratios and an odd gear ratio group having at least first, third, fifth, and seventh ratios;
a countershaft rotatably supporting a plurality of said ratio gear members;
a plurality of synchronizers selectively connecting said countershaft with individual ones of said ratio gear members to selectively establish gear ratios between said power input shaft and said power output shaft; and
at least one synchronizer directly connecting said power input shaft with said power output shaft, and
wherein a common housing will accommodate either:
a single input clutch employed and said power input shaft connectible therewith, said first and second ratios are longitudinally adjacent and controlled by a first of said synchronizers, said third and fourth ratios are longitudinally adjacent and controlled by a second of said synchronizers, said fifth and sixth ratios are longitudinally adjacent and controlled by a third of said synchronizers, and said seventh ratio and said reverse ratio are adjacent and are controlled by a fourth of said synchronizers, or
dual input clutches employed to individually connect said power input shaft with said first and second transmission input shafts, pairs of said even ratio group are arranged to be longitudinally adjacent and pairs of said odd ratio group are arranged to be longitudinally adjacent with said first and third ratios controlled by a first of said synchronizers, said second and reverse ratios are adjacent and controlled by a second of said synchronizers, said fifth and seventh ratios are adjacent and controlled by a third of said synchronizers, said fourth and sixth ratios are adjacent and controlled by a fourth of said synchronizers.

2. The power transmission of claim 1 wherein said synchronizers are manipulated by a control mechanism including an H pattern shift control, a plurality of shift rails and a plurality of shift forks.

3. A power transmission comprising:
a power input shaft;
a power output shaft;
a first transmission input shaft and a second transmission input shaft;
means for connecting said first and second transmission input shafts with said power input shaft;
a plurality of ratio gear members disposed in meshing relation to provide a plurality of ratio gear pairs selectively operable to provide an even gear ratio group having at least second, fourth and sixth ratios and an odd gear ratio group having at least first, third, and fifth ratios;
a first countershaft member and a second countershaft member arranged in non-concentric parallel arrangement rotatably supporting said plurality of ratio gears members;
a plurality of synchronizers, including a synchronizer for each said ratio gear pair, selectively connecting said first and second countershaft members with individual ones of said ratio gear members to selectively establish gear ratios between said power input shaft and said power output shaft; and
at least one synchronizer directly connecting said power input shaft with said power output shaft; and
wherein a common housing will accommodate either:

a single input clutch having said power input shaft means connectible therewith, wherein said first and second ratios are longitudinally adjacent and controlled by a first of said synchronizers, said third and fourth ratios are longitudinally adjacent and controlled by a second of said synchronizers, and said fifth and sixth ratios are longitudinally adjacent and controlled by a third of said synchronizers, or dual input clutches employed to individually connect said power input shaft means with said first and second transmission input shaft, wherein pairs of said even ratio group are arranged to be longitudinally adjacent and pairs of said odd ratio group are arranged to be longitudinally adjacent, and wherein said first and third ratios have the same synchronizer.

4. The power transmission defined in claim 3 further comprising:

said odd ratios being disposed on one of said countershaft members and said even ratios being disposed on the other of said countershaft members.

5. A power transmission comprising:

a power input shaft;

a power output shaft;

a first transmission input shaft and a second transmission input shaft;

means for connecting said first and second transmission input shafts with said power input shaft;

a plurality of ratio gear members disposed in meshing relation to provide a plurality of ratio gear pairs selectively operable to provide an even gear ratio group having at least second, fourth and sixth ratios and an odd gear ratio group having at least first, third, fifth, and seventh ratios;

a countershaft rotatably supporting said plurality of ratio gears members;

a plurality of synchronizers selectively connecting said countershaft with individual ones of said ratio gear members to selectively establish gear ratios between said power input shaft and said power output shaft; and at least one synchronizer directly connecting said power input shaft with said power output shaft, and wherein a common housing accommodates a single input clutch having said power input shaft connectible therewith, and wherein said first and second ratios are longitudinally adjacent and controlled by a first of said synchronizers, said third and fourth ratios are longitudinally adjacent and controlled by a second of said synchronizers, and said fifth and sixth ratios are longitudinally adjacent and controlled by a third of said synchronizers.

6. The power transmission of claim 5 wherein said reverse and seventh gear ratios are longitudinally adjacent and controlled by a fourth of said synchronizers.

7. The power transmission of claim 6 wherein said synchronizers are manipulated by a control mechanism including an H pattern shift control, a plurality of shift rails and a plurality of shift forks.

* * * * *